United States Patent [19]

Towner et al.

[11] Patent Number: 4,688,201
[45] Date of Patent: Aug. 18, 1987

[54] FOCUSING AND TRACKING APPARATUS FOR AN OPTICAL DATA STORAGE DEVICE

[75] Inventors: David K. Towner; David K. Campbell, both of Boise, Id.

[73] Assignee: Hewlett-Packard Company, Palo Alto, Calif.

[21] Appl. No.: 692,278

[22] Filed: Jan. 16, 1985

[51] Int. Cl.[4] .............................................. G11B 7/00
[52] U.S. Cl. ...................................... 369/44; 369/45; 369/112; 369/119
[58] Field of Search .................. 358/901, 342; 369/32, 369/33, 119, 41–46, 111, 112; 250/201–204

[56] References Cited

U.S. PATENT DOCUMENTS 1,759,594  5/1930  Round ............................. 358/240 X
4,498,158  2/1985  Akiyama ............................... 369/32

OTHER PUBLICATIONS

IBM Technical Disclosure Bulletin, vol. 20, #1, Jun. 1977, pp. 400–402.

Primary Examiner—Robert L. Richardson
Attorney, Agent, or Firm—Leslie G. Murray

[57] ABSTRACT

A two-stage beam positioning apparatus for use in an optical data storage device is provided. A fixed assembly includes a light beam source and detector, light beam focusing and track following apparatus. The fixed assembly is optically coupled to a movable assembly which provides coarse positioning of a focused light spot on a data storage medium such as an optical recording disc. The coarse positioning assembly is mechanically independent from the light beam source and detector assembly and, therefore, may be made very stiff and light resulting in a high bandwidth and reduced data access time. Since the light beam source and detector assembly and the focusing and track following control apparatus are mechanically isolated from the movable coarse positioning assembly, the size and mass of these components are not critical and do not affect data access time.

4 Claims, 4 Drawing Figures

FOCUSING AND TRACKING APPARATUS FOR AN OPTICAL DATA STORAGE DEVICE

BACKGROUND AND SUMMARY OF THE INVENTION

This invention relates to data storage devices which record and/or retrieve data recorded on rotating optical data recording discs. The data is stored on the discs in spiral or concentric tracks and is recorded or retrieved by modulation of a beam of light focused along the tracks on the disc. In particular, this invention provides an improved means of focusing and positioning a focused spot on the desired track.

Optical data storage devices usually include an optical system comprising lasers, collimating lenses, beam shaping prisms, beam splitters, plane mirrors, an objective lens, a focus positioner, a tracking positioner, collecting lenses and detectors. These components are typically incorporated in one optical source/detector assembly (sometimes called an optical head).

A typical optical head measures several centimeters on a side and may weigh about 100 grams. Owing to its size and weight and the nature of the focus and tracking mechanisms, it is not practical to attempt to move such optical heads at high speeds and acceleration rates. This limitation has seriously reduced the ability of optical data storage systems to perform many random accesses to data per unit time. Typical average access times reported for state of the art optical data storage products are in the range of 50-500 milliseconds. When used with an appropriate actuator motor, the present invention reduces the average access time to less than 5 milliseconds.

One, fast, random-access, linear positioner for an optical data storage device is described in part in U.S. Pat. No. 4,322,838. This positioner includes a parallelogram suspension with the objective lens mounted on the free link. Light beam focus correction located remotely from the parallelogram suspension, "upstream" of the positioner mechanism along a light beam, is also disclosed.

A rotary positioner for an optical disc memory is described in a technical article entitled "Low Inertia Scanner Performance and Selection" by D. Alan, J. Montague and B. Brosens published in *Electro-Optical Systems Design*, Vol. 10, No. 11, pp. 48–52, in November 1978. The rotary positioner described incorporates rotation of the actuator arm about the axis of the light beam.

An optical source/detector assembly constructed according to the principles of the present invention includes both focus and track following control apparatus remote from the moving parts of the coarse rotary positioner (also called an actuator). Since it is stationary, the size and mass of such an optical source/detector assembly do not affect the speed of the actuator or access time of the optical data storage device. The moving parts of the actuator can therefore be made very stiff and light weight (i.e., low inertia), characteristics which contribute to high speed controlled motion.

Although two-stage rotary positioners are common in the art, in this system the stages are mechanically independent. The coarse positioner for long accesses across many tracks does not move the fine positioner which is designed for short accesses and track following. As a result, the size and mass of the fine positioner are not critical because it is not accelerated by the coarse positioner mechanism. The focus positioner is also mechanically independent of the coarse positioner, resulting in similar design advantages.

Coarse positioning of the focused spot in the present invention is provided by a rotating arm attached to a torque motor. Since the arm can be small, having low inertia, very high performance torque motors of the kind employed in galvanometers may be used. The design of the optical path within the rotating arm eliminates most of the yaw or rotation of the focused light beam or beams.

The optical and mechanical components of the present invention can be arranged so that any desired region of an arbitrarily large disc can be accessed. If desired, optical heads of conventional design can be used without alteration in conjunction with such optical and mechanical components.

By making the arm of the present rotary actuator low inertia and mechanically rigid, the bandwidth of the coarse positioner is increased. Increased bandwidth allows the coarse positioner to follow the large amplitude low frequency components of radial run-out of the disc. Thus, more run-out can be tolerated and/or higher disc rotation rates can be achieved using the actuator of the present invention. Thus, in some configurations, the present invention facilitates removable media and smaller rotational latency times.

DESCRIPTION OF THE PREFERRED EMBODIMENT

Figure 1:
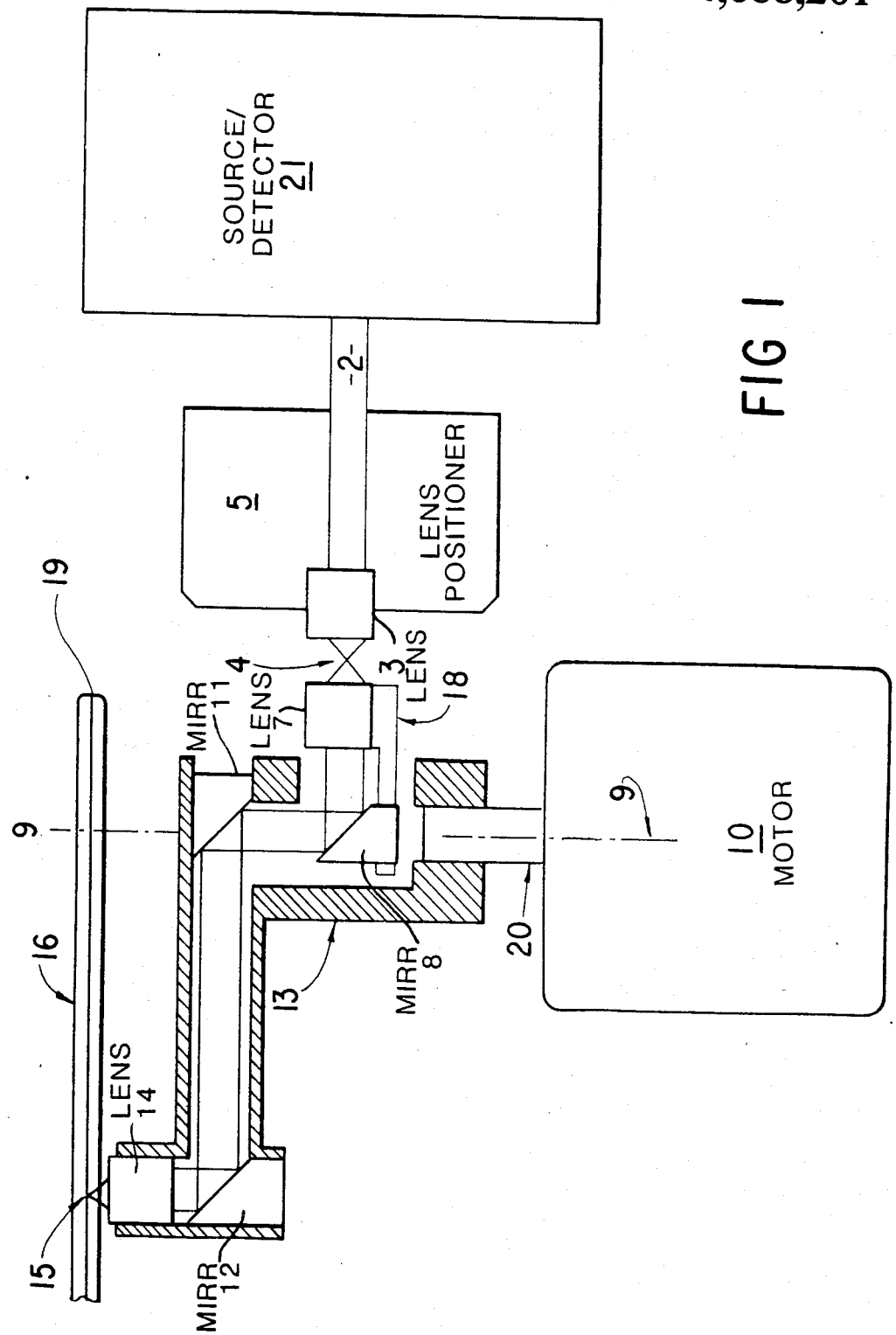
FIG. 1 is a cross-sectional view of the actuator and source/detector assembly constructed according to the principles of the present invention.
Figure 3:
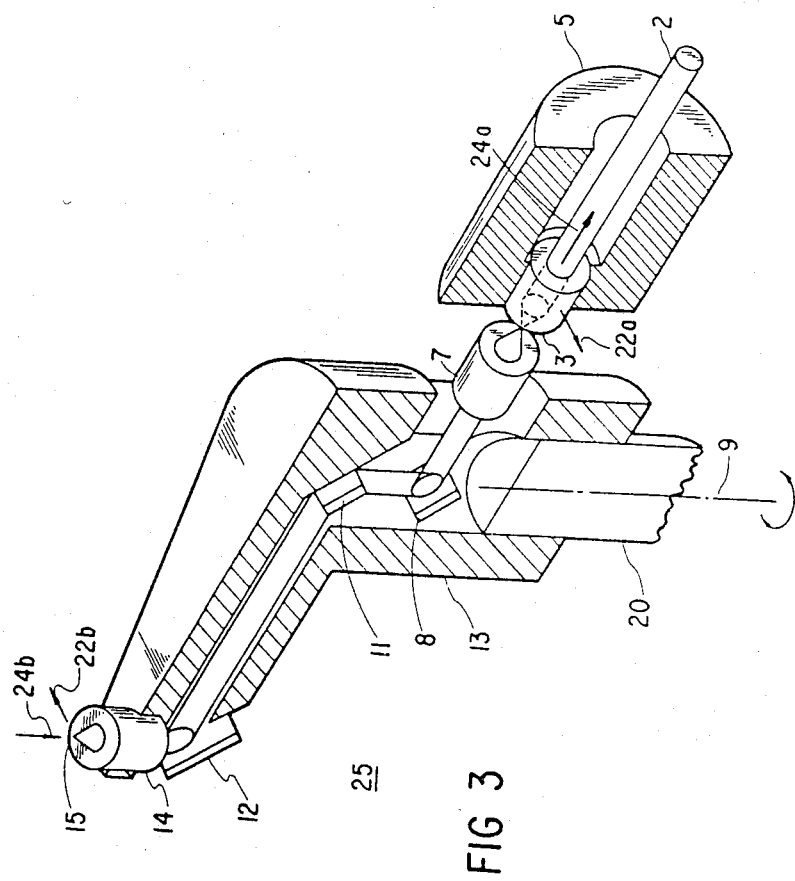
FIG. 3 is a cut-away perspective view of the actuator of FIG. 1.

Referring to FIGS. 1 and 3, source/detector assembly 21 houses a laser source and components for data read-out detection, focus error detection and tracking error detection. Assembly 21 also includes other components for controlling and directing light emitted to and received from disc 16 via the optical system of the present invention.

Lens 3 receives light beam 2 emitted by assembly 21 and forms intermediate focus 4. Lens 3 is moveable along the axis of beam 2 by lens positioner 5. Lens positioner 5 also moves lens 3 at right angles to the axis of beam 2 for track following, which is discussed in more detail elsewhere in this specification. As lens 3 is moved by lens positioner 5, intermediate focus 4 moves in the same direction and a corresponding distance as lens 3.

Relay lens 7 receives and approximately collimates beam 2 after it passes through intermediate focus 4. Beam 2 is then reflected by mirror 8 which is mounted on non-rotating bracket 18. The optical axis of beam 2 as reflected substantially coincides with the axis of rotation 9 of torque motor 10. Mirrors 11 and 12 are located in and attached to rotary arm 13 so that the axis of beam 2 passes through the center of objective lens 14 regardless of the rotational position of arm 13.

Objective lens 14 focuses beam 2 to form focused spot 15 in the plane of recording layer 19 of the optical media on data storage disc 16. Focused spot 15 is an image of intermediate focus 4 and is displaced perpendicularly from the plane of disc 16 by the motion of lens positioner 5 along the axis of beam 2.

Figure 2:
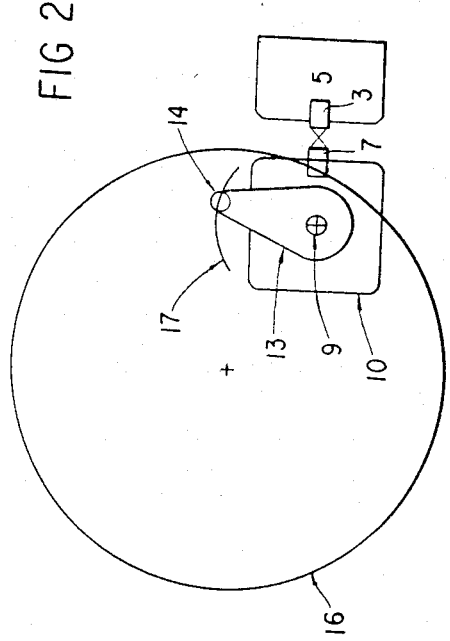
FIG. 2 is a top view of the actuator of FIG. 1.

Referring now to FIGS. 2 and 3, focused spot 15 is displaced radially in the plane of disc 16 by coarse positioner assembly 25. Coarse positioner assembly 25 includes torque motor 10, shaft 20 of which is fixedly connected to arm 13 and rotates about axis 9. As shaft 20 rotates, focused spot 15 is moved from track-to-track in recording layer 17 as lens 14 moves in arc 17 about axis 9. Torque motor 10 and arm 13 are disposed with respect to disc 16 so that arc 19 lies approximately along a radius of disc 16 to enable focused spot 15 to be positioned on any desired track.

Referring again to FIG. 3, if lens 3 is displaced orthogonally to the axis of beam 2 in direction 22a, focus 4 will be correspondingly displaced. Similarly focused spot 15 will be oppositely displaced in direction 22b, substantially perpendicular to the center of the track on which it is directed by objective lens 14. Displacement of focused spot 15 opposite to direction 22b is achieved by corresponding displacement of lens 3 in a direction opposite to direction 22a.

Fine positioning and track following control of focused spot 15 is provided by lens positioner 5. As stated elsewhere in this specification, lens positioner 5 moves lens 3 along the axis of and at right angles to the axis of beam 2.

Lens positioner 5 is responsive to focus error signals and tracking error signals produced by the focus error and tracking error detectors in source/detector assembly 21. A focus error detector, such as the astigmatic type or the Foucault knife edge type, produces a signal representing de-focusing of spot 15 in recording layer 19 which may be caused by run out error, disc warping or other change in coarse positioner assembly 25. Lens positioner 5 moves lens 3 along the axis of beam 2 in direction 24a in response to the error signal to readjust focused spot 15 in direction 24b in the plane of recording layer 19. Of course, focused spot 15 is adjusted in a direction opposite to direction 24b when lens positioner 5 is moved in a direction opposite to direction 24a.

A tracking error detector, such as the three-spot type or the far-field diffraction type is employed to produce signals representing the distance and direction from track center which focused spot 15 has moved. Such movement away from track center may be caused by radial disc runout, track eccentricity, shock and vibration or other conditions which affect the fine position of focused spot 15. Lens positioner 5 moves lens 3 perpendicular to the axis of light beam 2 to re-center focused spot 15 along the center of the track on which it is focused by objective lens 14.

Figure 4:
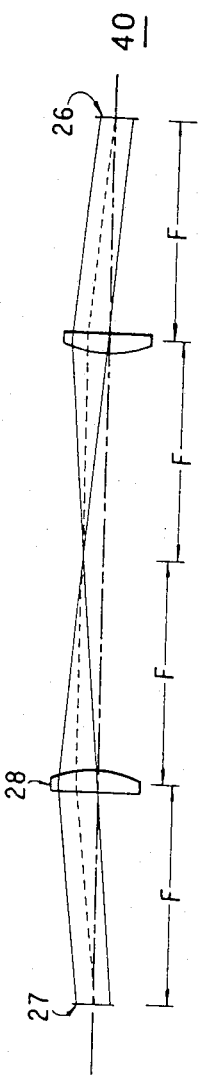
FIG. 4 is a top schematic view of an optical relay for use in the actuator of FIG. 1.

Referring now to FIGS. 3 and 4, optical relay 40 may be inserted along the axis of beam 2 between lens 7 and mirror 8 to image exit pupil 26 of lens 7 into entrance pupil 27 of objective lens 14. Note that reflections at mirrors 8, 11 and 12 occur between lenses 28 and 14, but are not shown in FIG. 4. Such a relay eliminates vignetting of beam 2 at objective lens 14 and acts to expand the dynamic range of adjustment of focused spot 15. The adjustment range is then limited by the useful optical field of the lens system. The optical field is defined as the region in the plane of focus within which the lens forms an acceptably small focused spot.

Without relay 40, movement of focus 4 by lens positioner 5 can cause unacceptable loss of light due to vignetting at objective lens 14, thereby restricting the adjustment range in the cross-track direction to less than the optical field of lens 14. Similarly, relay 40 eliminates overfilling and underfilling of objective lens 14 which would otherwise occur in response to motion of lens positioner 5 and focus 4 along the axis of beam 2 as is required to correct focus errors.

What is claimed is:

1. Apparatus for use in an optical data storage device having a rotating disc media for recording data along tracks in a recording layer, said apparatus comprising:
   a chassis;
   a source of light rigidly mounted on the chassis for emitting a beam of light;
   intermediate beam adjusting means movably mounted on the chassis for receiving and transmitting light from the source;
   objective lens means for focusing the beam of light into a spot; and
   coarse positioning means, movably mounted on the chassis and mechanically independent from the intermediate beam adjusting means, the objective lens means being mounted thereon, said coarse positioning means for directing light received from the intermediate beam adjusting onto the recording layer of the rotating disc media, said intermediate beam adjusting means also being effective for adjusting at least two geometric properties of the beam of light.

2. Apparatus as in claim 1 wherein said intermediate beam adjusting means is effective for adjusting the position of said spot along the axis of the beam of light transmitted by the objective lens means and for adjusting the position of said spot radially in the plane of the rotating disc media.

3. Apparatus as in claim 2 further including optical relay means disposed along the axis of the beam of light between the intermediate beam adjusting means and the objective lens means for minimizing vignetting of the beam of light at the objective lens means.

4. Apparatus as in claim 3 further including a torque motor mounted on the chassis, said torque motor having an output shaft, said coarse positioning means mounted on said output shaft for rotary motion.

* * * * *